United States Patent [19]

Minami et al.

[11] 3,919,668

[45] Nov. 11, 1975

[54] DEVICE FOR GENERATING VARIABLE VOLTAGE

[75] Inventors: Shunji Minami, Moriguchi; Shunzo Oka, Hirakata, Japan

[73] Assignee: Matsushita Electric Industrial Co., Ltd., Osaka, Japan

[22] Filed: Oct. 15, 1973

[21] Appl. No.: 406,239

[30] Foreign Application Priority Data

| | | |
|---|---|---|
| Oct. 20, 1972 | Japan | 47-105417 |
| Oct. 20, 1972 | Japan | 47-121608 |
| Oct. 20, 1972 | Japan | 47-121612 |

[52] U.S. Cl. .......... 331/130; 307/247 A; 307/304; 331/111; 307/228

[51] Int. Cl.² .......... H03K 4/08

[58] Field of Search ....... 307/247 A, 251, 304, 311, 307/228, 202 R; 340/173 CA; 331/127, 130, 131, 111

[56] References Cited

UNITED STATES PATENTS

| | | | |
|---|---|---|---|
| 3,373,295 | 3/1968 | Lambert | 307/238 |
| 3,571,620 | 3/1971 | Hansen | 307/304 X |
| 3,582,220 | 6/1971 | Nobusawa | 307/311 X |
| 3,647,940 | 3/1972 | Harwood | 307/238 |
| 3,721,832 | 3/1973 | Lee | 307/304 X |
| 3,742,261 | 6/1973 | Schneider | 307/304 |
| 3,751,688 | 8/1973 | Hooghordel | 307/247 A |

*Primary Examiner*—John S. Heyman
*Attorney, Agent, or Firm*—Burgess Ryan and Wayne

[57] ABSTRACT

A device for generating a variable output voltage is disclosed which comprises a MOS field-effect transistor, a nonpolarized capacitor inserted between the gate of the transistor and ground, an output resistor inserted between the source of the transistor and the ground, and a neon bulb, one electrode of which is connected through a control resistor to the gate of the transistor. The voltage across an output resistor which varies in response to the variation in voltage impressed to the gate of the transistor is provided as an output voltage. The device accomplishes the same function of a conventional variable resistor, but the noise caused by the sliding contact of a movable arm with a resistor of the variable resistor may be eliminated. Long service life is ensured and the variation in output voltage characteristic is minimized.

5 Claims, 6 Drawing Figures

DEVICE FOR GENERATING VARIABLE VOLTAGE

BACKGROUND OF THE INVENTION

The present invention relates to a device for generating a variable output voltage of the type in which the magnitude of current flowing from the drain to the source of MOS field-effect transistor varies in response to the voltage which is impressed on the gate thereof and which in turn varies in response to the voltage charge across a nonpolarized capacitor so that the output voltage derived across an output resistor may be varied and may drop instantaneously to zero when the MOS field-effect transistor is about to be saturated.

So far variable resistors have been used to provide a variable voltage, but since a movable arm or slider slides over a resistor, noise is produced, the service life is short because of the wear of the resistor, and the resistance characteristic varies in response to changes in ambient temperature. Furthermore, it is impossible to decrease the maximum output voltage instantaneously to zero.

SUMMARY OF THE INVENTION

In view of the above, one of the objects of the present invention is to provide a device capable of varying the output voltage and dropping instantaneously the maximum voltage to zero.

Another object of the present invention is to provide a device which may accomplish the function of the conventional variable resistor, the mechanical arrangement of which is completely replaced by an electronic arrangement so that no noise is produced, and the wear of the resistor and the degradation of the output voltage characteristic may be prevented.

A further object of the present invention is to provide a device for generating a variable output voltage and for indicating the output voltage so that the level of volume may be visually indicated.

Briefly stated, the gate of a MOS field-effect transistor is connected through a resistor and a neon bulb to a negative terminal of a power source and through a resistor, a neon bulb and a single-pole single throw normally open switch to a positive terminal of the power source. The gate is also grounded through a nonpolarized capacitor. The gate voltage varies in response to the voltage across the nonpolarized capacitor, so that the drain-source current is varied. The variable output voltage is derived across an output resistor connected between the source of the transistor and the ground.

The above and other objects, features and advantages of the present invention will become more apparent from the following description of the preferred embodiments thereof taken in conjunction with the accompanying drawing.

DESCRIPTION OF THE PREFERRED EMBODIMENTS

Figure 1:
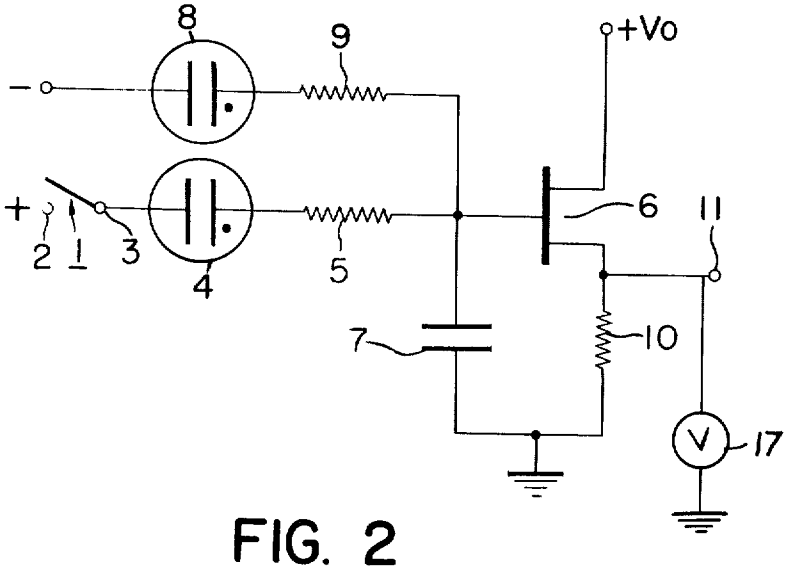
FIG. 1 is a circuit diagram of a first embodiment of the present invention.

Referring to FIG. 1, a positive contact 2 of a single-pole single-throw normally open switch 1 is connected to the positive terminal of a power source (not shown) whereas a contact 3 of switch 1 is connected to one terminal or electrode of a neon discharge lamp or neon bulb 4. The other terminal or electrode of the neon bulb 4 is connected through a resistor 5 to the gate of a MOS field-effect transistor 6. One electrode of a nonpolarized capacitor 7 is connected to the gate of the MOS field-effect transistor 6 whereas the other electrode is grounded. The gate of the MOS field-effect transistor 6 is also connected through a control resistor 9 to one electrode of a neon bulb 8 whose other electrode is connected to a negative terminal of the power source. The drain of the transistor 6 is connected to a drain supply voltage $+V_0$ whereas the source is connected to an output terminal 11 and to one terminal of a resistor 10 whose other end is grounded.

Next, the mode of operation will be described. When the switch 1 is closed, the neon bulb 4 is discharged thereby forming a conduction path so that the capacitor 7 is charged through the input resistor 5. The voltage across the capacitor 7 is impressed on the gate of the transistor 6 so that the current flows from the drain to the source. As a result, a voltage drop is produced across the output resistor 10, and the output voltage equal to this voltage drop is provided on the output terminal 11. As long as the switch 1 is closed and the transistor 6 is not saturated, the output voltage increases as the voltage across the capacitor 7 is increased. When the switch 1 is opened, the voltage across the capacitor 7 remains unchanged so that the output voltage on terminal 11 remains constant. When the capacitor 7 is further charged to a potential near the satuation potential of transistor 6, the neon bulb 8 starts discharging because its discharge starting voltage is so selected as to be close to the saturation voltage of the transistor 6. Therefore, the capacitor 7 is instantaneously discharged through the control resistor 9 and the discharge of the neon bulb 8 is stopped. As a result, the channel of the MOS field-effect transistor 6 is pinched off so that no current flows from the drain to the source. Therefore, the output voltage is zero.

Figure 2:
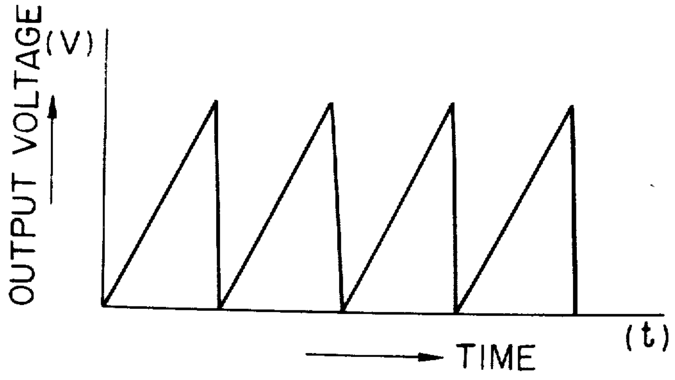
FIG. 2 is a graph illustrating the output voltage characteristic thereof.

Next, when the switch 1 is closed again, the capacitor 7 is charged again so that the above operation is cycled. The output voltage characteristic is shown in FIG. 2. The time is plotted along the abscissa whereas the output voltage is plotted along the ordinate. It is seen that when the switch 1 is closed the output voltage is gradually increased and that when the output voltage reaches a maximum level, it immediately drops to zero and then increases gradually again.

The neon bulb 4 serves to prevent the variation in voltage of the power source or to drop a high input voltage. Therefore, it may be eliminated.

Figure 3:
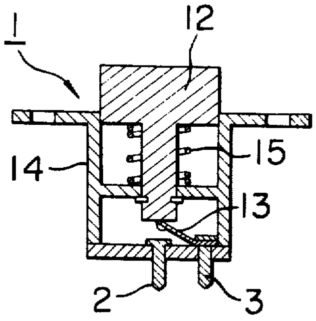
FIG. 3 is a sectional view of a single-pole single-throw normally open switch used in the device of the present invention.

Next, referring to FIG. 3, the switch 1 will be described in detail hereinafter. The single-pole single-throw normally open switch 1 comprises a push button 12, a movable elastic arm 13, the contacts 2 and 3 fixed to the bottom a switch enclosure 14, and a return spring 15. When the pushbutton 12 is depressed, the lower end thereof pushes the movavle arm or spring 13, thereby causing it to contact the positive contact 2, so that the switch 1 is closed. When the pushbutton 12 is released, it returns to its initial position under the forces of the return spring 15 and the elastic movable arm 13.

Figure 4:
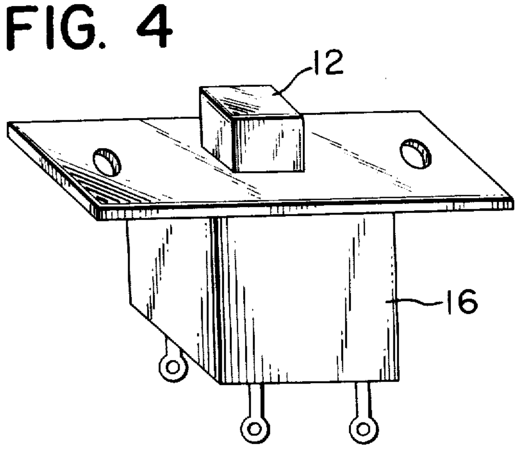
FIG. 4 is a perspective view of the first embodiment of the present invention.

FIG. 4 shows in a perspective view the device of the present invention. An enclosure 16 has positive and negative terminals connected to the positive contact 2 of the switch 1 and to the other electrode of the neon bulb 8, respectively; the output terminal 11, a terminal connected to the drain of the MOS field-effect transistor 6 and a ground terminal connected to the junction of the capacitor 7 and the output resistor 10. The circuit components shown in FIG. 1 are housed within the enclosure 16, but it is understood that they may be housed within the enclosure 14 of the switch 1.

Figure 5:
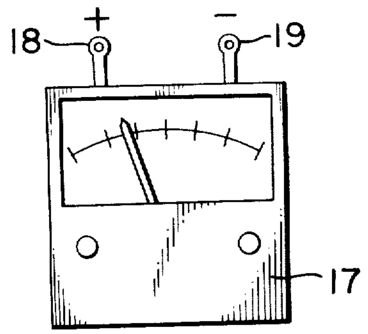
FIG. 5 is a front view of a DC voltmeter used in a second embodiment of the present invention.
Figure 6:
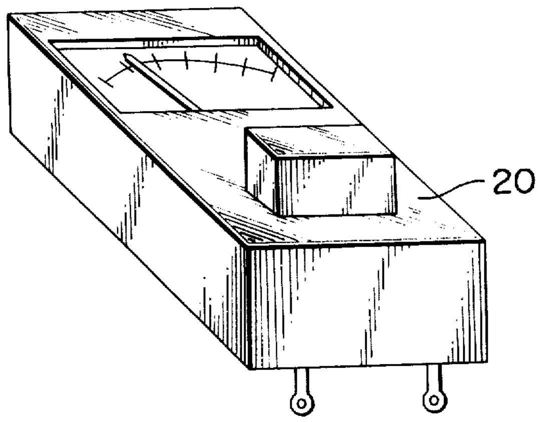
FIG. 6 is a perspective view of the second embodiment.

According to the present invention, a DC voltmeter 17 of the type shown in FIG. 5 may be used. That is, a positive terminal 18 of the voltmeter 17 is connected to the output terminal 11 (See FIG. 1) whereas a negative terminal 19 is grounded, so that the direct reading of the output voltage is possible. The circuit components shown in FIG. 1 and the DC voltmeter 17 shown in FIG. 5 are shown as being housed within an enclosure 20 shown in FIG. 6. The enclosure 20 also has positive and negative terminals, a terminals, a terminal for connecting the drain of the MOS field-effect transistor 6 to the drain voltage supply, and a grounding terminal (only two terminals are shown in FIG. 6). Alternatively, the circuit components as well as the DC voltmeter may be housed within the enclosure 14 of the switch 1 (See FIG. 3).

What is claimed is:

1. A device for generating a variable output voltage comprising:

a. a single-pole single-throw normally open switch having a first contact connected to an input voltage, b. an input resistor and a first neon bulb, c. an MOS field-effect transistor having a gate connected through said input resistor and first neon bulb to a second contact of said single-pole single-throw switch, said switch providing a means for selectively interrupting current flow through said input resistor, d. a control resistor, e. a second neon bulb connected in series with said control resistor, the gate of said MOS field-effect transistor being connected to a bias voltage having a potential opposite in polarity to said input voltage through said seriesconnected second neon bulb and control resistor, f. a non-polarized capacitor connecting the gate of said MOS field-effect transistor to ground, g. an output resistor connecting the source of said MOS field-effect transistor to ground, h. said input voltage, said switch, said first neon bulb and said input transistor comprising means for gradually charging said capacitor from said input voltage to a selected potential, whereby the voltage across said output resistor gradually increases, and i. said second neon bulb and control resistor comprise means responsive to the predetermined potential across said capacitor for rapidly discharging said capacitor, whereby when the voltage across said second neon tube reaches its ionization potential, said capacitor is discharged until the voltage across said second neon tube reaches its deionization potential, thereby rapidly reducing the voltage across said output resistor.

2. A device as defined in claim 1, further comprising an enclosure substantially surrounding the single-pole single-throw normally open switch, the MOS field-effect transistor, the non-polarized capacitor, the second neon bulb and the resistors;

a first terminal on an external surface of said enclosure being connected to a contact of said single-pole single-throw switch, a second terminal on said external surface of said enclosure being connected to a first electrode of said second neon bulb, a third terminal on said external surface of said enclosure being connected to the drain of said MOS field-effect transistor for providing the positive potential to said drain, the fourth terminal on said external surface of said enclosure being connected to the source of said MOS field-effect transistor, and a fifth terminal on the external surface of said enclosure being connected to said non-polarized capacitor and to said output resistor for providing a ground potential thereto.

3. A device as defined in claim 1, further comprising an enclosure substantially surrounding the single-pole single-throw normally open switch, the MOS field-effect transistor, the non-polarized capacitor, the first and second neon bulbs and the resistors;

a first terminal on an external surface of said enclosure being connected to a contact of said single-pole single-throw switch, a second terminal on said external surface of said enclosure being connected to an electrode of said second neon bulb, a third terminal on said external surface of said enclosure being connected to the drain of said MOS field-effect transistor for providing the positive potential to said drain, the fourth terminal on said external surface of said enclosure being connected to the source of said MOS field-effect transistor, and a fifth terminal on said external surface of said enclosure being connected to said non-polarized capacitor and to said output resistor for providing said ground potential thereto.

4. A device as defined in claim 1, further comprising;

a DC volt meter having a positive terminal connected to the source of said MOS field-effect transistor, and having a negative terminal connected to said non-polarized capacitor and to said output resistor;

an enclosure substantially surrounding the DC volt meter, the single-pole single-throw switch, the MOS field-effect transistor, the first and second neon bulbs, the non-polarized capacitor and the resistor;

the positive and negative terminals being provided on an external surface of said enclosure, a first terminal provided on said external surface of said enclosure being connected to a contact of said single-pole single-throw switch, a second terminal provided on said external surface of said enclosure being connected to an electrode of said second neon bulb, and a third terminal provided on an external surface of said enclosure being connected to the drain of said MOS field-effect transistor.

5. A device as defined in claim 1, further comprising:

a DC volt meter having a positive terminal connected to the junction between the source of said MOS field-effect transistor and said output resistor and a negative terminal connected to said non-polarized capacitor and said output resistor;

an enclosure substantially surrounding the DC volt meter, the single-pole single-throw switch, the MOS field-effect transistor, the first and second neon bulbs, and the non-polarized capacitor;

a positive terminal for receiving said input voltage provided on an external surface of said enclosure, a negative terminal for connecting the bias voltage being provided on said external surface of said enclosure, a first terminal connected to the contact of said single-pole single-throw switch being provided on said external surface of said enclosure, a second terminal connected to an electrode of said second neon bulb being provided on said external surface of said enclosure, and a third terminal connected to the drain of said MOS field-effect transistor being provided on said external surface of said enclosure.

* * * * *